United States Patent [19]

Pryor et al.

[11] Patent Number: 5,604,785
[45] Date of Patent: Feb. 18, 1997

[54] REMOTELY ACTUATED SWITCH AND PROTECTION CIRCUIT

[75] Inventors: Dennis M. Pryor; Michael Challis, both of Swindon, England

[73] Assignee: Raychem Limited, Swindon, England

[21] Appl. No.: 360,754

[22] PCT Filed: Jun. 30, 1993

[86] PCT No.: PCT/GB93/01371

§ 371 Date: Dec. 21, 1994

§ 102(e) Date: Dec. 21, 1994

[87] PCT Pub. No.: WO94/01960

PCT Pub. Date: Jun. 20, 1994

[30] Foreign Application Priority Data

Jul. 1, 1992 [GB] United Kingdom .................... 9213992

[51] Int. Cl.⁶ .............................. H04M 1/24; H04M 3/08; H04M 3/22
[52] U.S. Cl. ................................. 379/2; 379/29; 324/522
[58] Field of Search .............................. 379/1, 2, 8, 26, 379/27, 29, 30, 31, 32, 412, 413; 324/522; 370/13, 14

[56] References Cited

U.S. PATENT DOCUMENTS

| | | | |
|---|---|---|---|
| 3,725,613 | 4/1973 | Allen et al. | 179/175.3 |
| 4,143,250 | 3/1979 | Simokat | 179/175.3 R |
| 4,197,435 | 4/1980 | Jackson et al. | 379/29 |
| 4,462,085 | 7/1984 | Ziegler | 379/2 |
| 4,489,221 | 12/1984 | Walker et al. | 179/19 |
| 4,582,960 | 4/1986 | DeLuca et al. | 179/98 |
| 4,626,632 | 12/1986 | Mazz | 379/29 |
| 4,653,084 | 3/1987 | Ahuja | 379/29 |
| 4,710,949 | 12/1987 | Ahuja | 379/26 |
| 4,807,277 | 2/1989 | Perry | 379/29 X |
| 4,852,145 | 7/1989 | Bevers et al. | 379/27 |
| 4,862,491 | 8/1989 | La Salle et al. | 379/26 X |
| 5,345,496 | 9/1994 | Galpin | 379/29 |
| 5,357,556 | 10/1994 | Dresser | 379/27 |

FOREIGN PATENT DOCUMENTS

| | | | |
|---|---|---|---|
| 0291169 | 11/1988 | European Pat. Off. | H04M 3/18 |
| 3513598 | 10/1986 | Germany | H04M 3/30 |
| 2030820 | 4/1980 | United Kingdom | H04B 3/46 |
| 2149274 | 6/1985 | United Kingdom | H04M 3/22 |
| 2181625 | 4/1987 | United Kingdom | H04B 3/46 |
| 2263211 | 7/1993 | United Kingdom | H04B 3/46 |
| WO92/07402 | 4/1992 | WIPO | H02H 3/02 |
| WO92/10878 | 6/1992 | WIPO | H03K 17/08 |
| WO93/01639 | 1/1993 | WIPO | H02H 3/087 |

OTHER PUBLICATIONS

*Patent Abstracts of Japan*, vol. 15, No. 495 (P–1288), Dec. 13, 1991 (abstract for Japanese Application No. 3–214067, Murata Manufacturing Co. Ltd., Spe. 19, 1991.
Search Report for British Application No. 9213992.2, filed Jul. 1, 1992.
Search Report for International Application no. PCT/GB93/01371.
Search Report for International Application No. PCT/GB93/01376.
Tamio Motomitsu et al, "Development of Centralized Looptesting System for Subscriber Loops", *NTT Review*, vol. 3, No. 1, Jan. 1991, pp. 117–121.

*Primary Examiner*—Wellington Chin
*Assistant Examiner*—Paul Loomis
*Attorney, Agent, or Firm*—Herbert G. Burkard; Bruce M. Bertram; Marguerite E. Gerstner

[57] ABSTRACT

A switching arrangement that can be connected in a communications channel comprising a pair of lines, between sets of terminal equipment, which comprises:

(i) a pair of series switching circuits, each of which can be series connected in one of the lines and will open when subjected to an overcurrent in its associated line; and/or (ii) one or more shunt switching circuits connected between the lines, or between one or both the lines and earth, and will close when subjected to an overvoltage in its associated line;

wherein the or each switching circuit can be remotely actuated by means of a test signal sent along the channel.

10 Claims, 4 Drawing Sheets

REMOTELY ACTUATED SWITCH AND PROTECTION CIRCUIT

BACKGROUND OF THE INVENTION

1. Field of the Invention

This invention relates to communications circuits, and especially to maintenance termination units for use in telephone circuits.

2. Introduction to the Invention

In recent years, and especially in view of deregulation of many telephone systems, privately owned communication equipment has increasingly been installed in the premises of subscribers to the system, with the result that it is often necessary to determine whether any fault is located in the telephone line, or in the subscriber's premises, i.e. in the subscriber's equipment or cabling, in order to determine whose responsibility it is to repair the fault. It is highly advantageous economically if this determination can be performed remotely by sending an appropriate signal from the local exchange along the line, thereby obviating the necessity to send any telephone company personnel to the subscriber's premises.

In order to test the telephone line for any faults it is necessary firstly to install a so-called "maintenance termination unit" or MTU in the line at the subscriber's premises which can disconnect the subscriber equipment from the line (often called sectionalizing the line) and connect the a and b or tip and ring lines on receipt of the appropriate signals from the exchange. During the line testing procedure determinations will typically be made of the line to line resistance and of the first and second line to ground resistance. Also the line continuity can be determined by detecting the presence of the MTU electronically.

Various forms of MTU are described, for example, in U.S. Pat. No. 4,710,949 to Om Ahuja. This device comprises a pair of voltage sensitive switches, one located in each of the tip and ring lines, and a distinctive termination connecting the tip and ring lines on the subscriber side of the voltage-sensitive switches. The voltage-sensitive switches may each have a threshold voltage of about 16 volts so that they are closed in normal operation by the 48 volt battery voltage but will open when this is replaced by a test voltage below about 32 volts in order to test the line-to-ground and tip-to-ring impedances. The distinctive termination may, for example, comprise a back-to-back diode and Zener diode which will exhibit an asymmetric resistance when large voltages (higher than the operating voltages) of different polarity are applied.

In addition to the provision of an MTU in a communications system, the system will normally need to be protected against overcurrents and also overvoltages in the communications channel which may, for example, be caused by equipment failure, electromagnetic interference, electrostatic discharge, connection to mains voltage power supply and the like. This is normally achieved by incorporating separate components such as spark gaps, triacs, etc., in the system.

SUMMARY OF THE INVENTION

The present invention is based on the appreciation that it is possible to employ the same switching circuit both as a remotely actuated switch for subscriber isolation, or loop back testing, and also as a device for protecting the subscriber equipment or the exchange equipment from an overcurrent or overvoltage.

Thus, according to the present invention, there is provided a switching arrangement that can be connected in a communications channel comprising a pair of lines, between sets of terminal equipment, which comprises:

(i) a pair of series switching circuits, each of which can be series connected in one of the lines and will open when subjected to an overcurrent in its associated line; and/or (ii) one or more shunt switching circuits connected between the lines, or between one or both the lines and earth, and will close when subjected to an overvoltage in its associated line;

wherein the or each switching circuit can be remotely actuated by means of a test signal sent along the channel.

DETAILED DESCRIPTION OF THE INVENTION

The switching arrangement according to the invention has the advantage that a single switch is employed in each signal line (in the case of series switches) to provide two functions, namely remote disconnection and overcurrent protection, thereby improving the reliability of the arrangement, reducing its insertion loss in the lines and reducing its cost by reducing the number of signal carrying components. In addition, the shunt and series switching circuits can be operated at will, thereby enabling remote testing of the circuit protection.

The control circuitry for the switches may be actuated in any of a number of ways, e.g. by means of a DC applied voltage on the line or by an AC signal of a given frequency. In a preferred arrangement according to the invention a DC voltage window detector circuit (referred to herein as a window detector circuit) is connected between the lines and will allow a current to flow through it when, and only when, the voltage between the lines is within a predetermined band, the current flowing through the window detector circuit actuating the switching circuits.

Since the test voltage that is applied to the arrangement in order to open the series switching circuits and close the shunt switching circuit will normally be significantly less than the peak voltage applied during ringing, the switching circuits would attempt to switch during that period in the ringing cycle that the applied voltage is within the predetermined band. Such switching can be prevented by including a low pass filter in the arrangement with a sufficiently low cut-off frequency. The required cut-off frequency will depend on the width of the voltage band within which current will flow in the window circuit; the narrower the band is, the higher the cut-off frequency may be, since the applied voltage will spend less time within the predetermined band during each cycle. For example, a voltage band of 20 V will correspond to a cut-off frequency of approximately 300 Hz.

The window detector circuit that determines the applied voltage at which the switches will open and close may include a Zener diode that sets the lower limit of the applied voltage that will cause current to flow. The upper limit of the applied voltage may conveniently be set by means of an overcurrent switching circuit that will open when the current passing through the circuit, and hence the voltage applied across it, exceeds a predetermined value. When the applied voltage is within this band the window circuit will send a signal of some sort to the switching circuits.

The preferred arrangement according to the invention has the advantage that it can be actuated by a signal of amplitude between that of the normal communications signals and the ringing signal without the ringing signal triggering the switch or switches and without the need to employ ringing bypass capacitors in the lines. The distortion of the ringing signal is reduced by use of overcurrent switching circuits as the series switches. The circuits employed in the arrangement according to the invention can switch on to their conductive state with applied voltages as low as one p-n junction drop (0.6 V) which, combined with the voltage drop across any diode bridges present will cause a crossover distortion of less than 2 volts in the ringing signal, in contrast with one of about 32 volts caused by the voltage sensitive switches employed in U.S. Pat. No. 4,710,949 in the absence of ringing bypass capacitors.

The series switching circuit in each of the lines is usually a solid state switch, normally formed in silicon, and preferably comprises a switching transistor whose input voltage is controlled by an overcurrent control element which switches on when the switching circuit is subjected to an overcurrent, thereby turning the switching transistor off. Such a circuit on its own will only switch in response to an overcurrent in its associated line. However, the circuit includes a test control element that also controls the input voltage of the switching transistor. The test control element turns on when current flows in the window circuit, thereby turning the switching transistor off. Thus, in this way the series switching circuits can be actuated either remotely or by an overcurrent in the line. The control elements may be formed from any of a number of devices, and the choice of control element will depend to some extent on the type of switching transistor employed. The overcurrent control element may, for example comprise a transistor whose base or gate is held in a potential divider that spans the switching transistor so that the base-emitter or gate-source voltage increases as the current in the line increases. Alternatively the control element may comprise a comparator that compares a fraction of the voltage across the switching transistor with a reference voltage and opens the switch if the fraction is greater than the reference voltage, as described in our copending international application No. PCT/GB91/02215. If a normally on FET such as a JFET or a depletion mode MOSFET is employed as the switching transistor, a negative voltage generator, e.g., a charge pump, or an optocoupler may be employed as the control element, as described in our copending British application No 9114717.3. The disclosures of these specifications are incorporated herein by reference.

It will normally be desirable for the shunt switching circuit to be capable of being switched independently of the series switching circuits. For example, the shunt switching circuit will need to be closed during a loop-back test to determine the line continuity (in which case it does not strictly matter whether the series switching circuits are open or closed), while the shunt switching circuit and the series switching circuits will all need to be open in order to determine the line insulation resistance (tip to ring resistance, etc.). Independent actuation of the switches may be achieved for example by altering the polarity of the applied DC signal in order to actuate different switches. In this case the signal inputs for the shunt and series switching circuits may be connected to different lines in the window circuit, in each of which current is constrained to flow only when the DC actuating signal has the correct polarity.

Each series switching circuit is preferably capable of remaining open for a period of time after termination of the actuating DC signal in order to be able to perform one or more tests on the line without the need to maintain the DC signal or while the polarity of the signal is reversed. For example, the circuit may remain open for up to 1 minute, but more usually for up to 20 to 40 seconds, and usually for at least 5 seconds. In the circuit described above, this may be achieved by including a capacitor between the base and emitter terminals or gate and source terminals of the test control element. The capacitor is charged up during actuation of the switching circuits by the DC signal, and holds the test control element on and hence the switching transistor off, for a period of time after actuation by the DC signal.

The series switching circuits may employ bipolar transistors and/or field effect transistors. Where bipoplar transistors are used they are preferably used in a darlington configuration as the switching transistor in order to reduce the base current required when the transistor is switched on. The base current must be supplied via a resistor connected between the base and collector of the switching transistor. When the circuit switches to its blocking or open state the switching transistor base current is diverted through the control element (which is now on) and becomes a leakage current. However, since the voltage drop across the resistor is much higher when the arrangement is in its blocking state, the leakage current is larger than the switching transistor base current. If a darlington pair or triplet is employed the effective DC current gain will be increased considerably so that a much higher resistance can be used.

Where field effect transistors are employed, MOSFETs are preferred, for example enhancement mode MOSFETs although depletion mode MOSFETs may be employed, particularly where linearity is important. Examples of depletion mode MOSFET switches are described in our copending British patent application No 9114717.3, mentioned above. The resistors employed in the switching circuit may be provided by MOSFETs, for example with their gates and drains connected as in NMOS logic. Alternatively, the control transistor and the resistor which together form the voltage divider for the base and gate of the switching transistor may be provided by a complementary n-channel and p-channel pair of FETs connected in the manner of CMOS logic.

It is preferred for the series switching circuits to include no resistive components in series with the switching transistor. Such an arrangement reduces the voltage drop or insertion loss along the line of circuit, and, in addition, reduces the area of silicon that needs be employed in an integrated circuit design of the arrangement, thereby reducing the cost.

The shunt switching circuit will normally comprise a triac connected between the lines. The gate of the triac will be connected to one of the lines via a pair of back-to-back Zener diodes so that an overvoltage greater than the Zener breakdown voltage will cause a current pulse to be applied to the triac gate and cause the triac to operate. In addition the gate of the triac may be connected to the window circuit so the current flowing in the window circuit will also operate the triac. As with the series switching circuits, a low pass filter is provided in the shunt switching circuit in order to prevent nuisance tripping of the shunt switching circuit by the ringing signal. The shunt switching circuit may connect the two lines together directly or via further components. For example the lines may be connected together via a distinctive termination, e.g. a diode and a Zener diode back-to-back so that the resistance of the termination is non linear and polarity dependent.

The window circuit may be connected to the switching circuits by any of a number of means. For example, in one form of device, they may be connected by means by of an optoelectronic coupler. In other forms of device they may be DC coupled to the window circuit, for example taking their actuating voltage from the voltage drop across a resistor in the window circuit.

Preferably all components of the arrangement take their power from the current in the lines or from the voltage drop between them so that no separate power supply rails are needed.

It is quite possible to produce a number of arrangements each having a different DC actuation voltage window so that they can be connected at various points along a long channel in order to divide the channel into sections for locating a fault.

BRIEF DESCRIPTION OF THE DRAWING

Two forms of arrangement according to the present invention will now be described by way of example with reference to the accompanying drawings in which.

DETAILED DESCRIPTION OF THE DRAWING

Referring to the accompanying drawings, a maintenance termination unit 1 for a telephone line comprises a pair of series switching circuits 2 located in each of the lines of a communication channel, each series switching circuit being controlled by means of a window circuit 3. The window circuit 3 also controls an overvoltage shunt switching circuit 4 that shunts any overvoltage across the load. In an alternative circuit it is possible for an earth connection to be provided, in which case the overvoltage circuit may be employed to shunt the overvoltage to earth.

In order to perform a maintenance test on the line, which may be a routine test or may be due to a subscriber complaint, a positive DC voltage of 80 to 100 V is first applied between the lines, whereupon the shunt switching circuit 4 closes and connects the lines together. This enables a loop back test to be performed in which the overall line resistance can be measured. As soon as the applied voltage is removed the shunt switching circuit will open. Application of a negative voltage of between 80 and 100 V between the lines will cause the series switching circuits 2 to open, thereby isolating the subscriber from the line. The series switching circuits will remain open for a period of about 20 seconds after the voltage is removed allowing the line-to-line and line-to-ground resistances to be evaluated.

Figure 1:
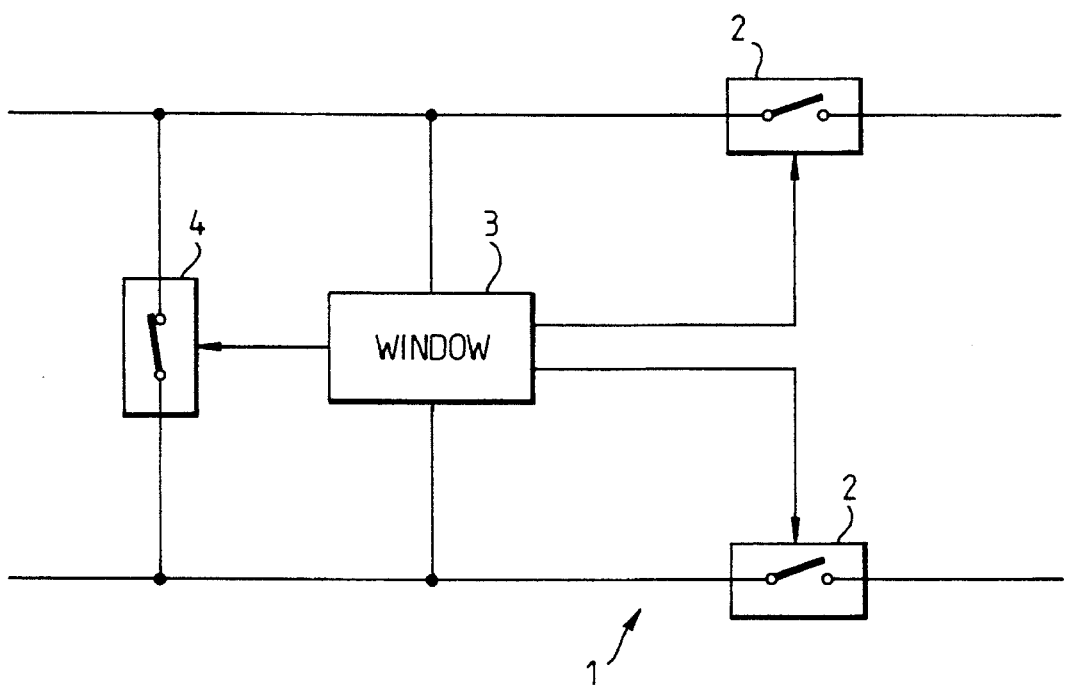
FIG. 1 is a block diagram indicating the main components of the arrangement according to the invention.
Figure 2:
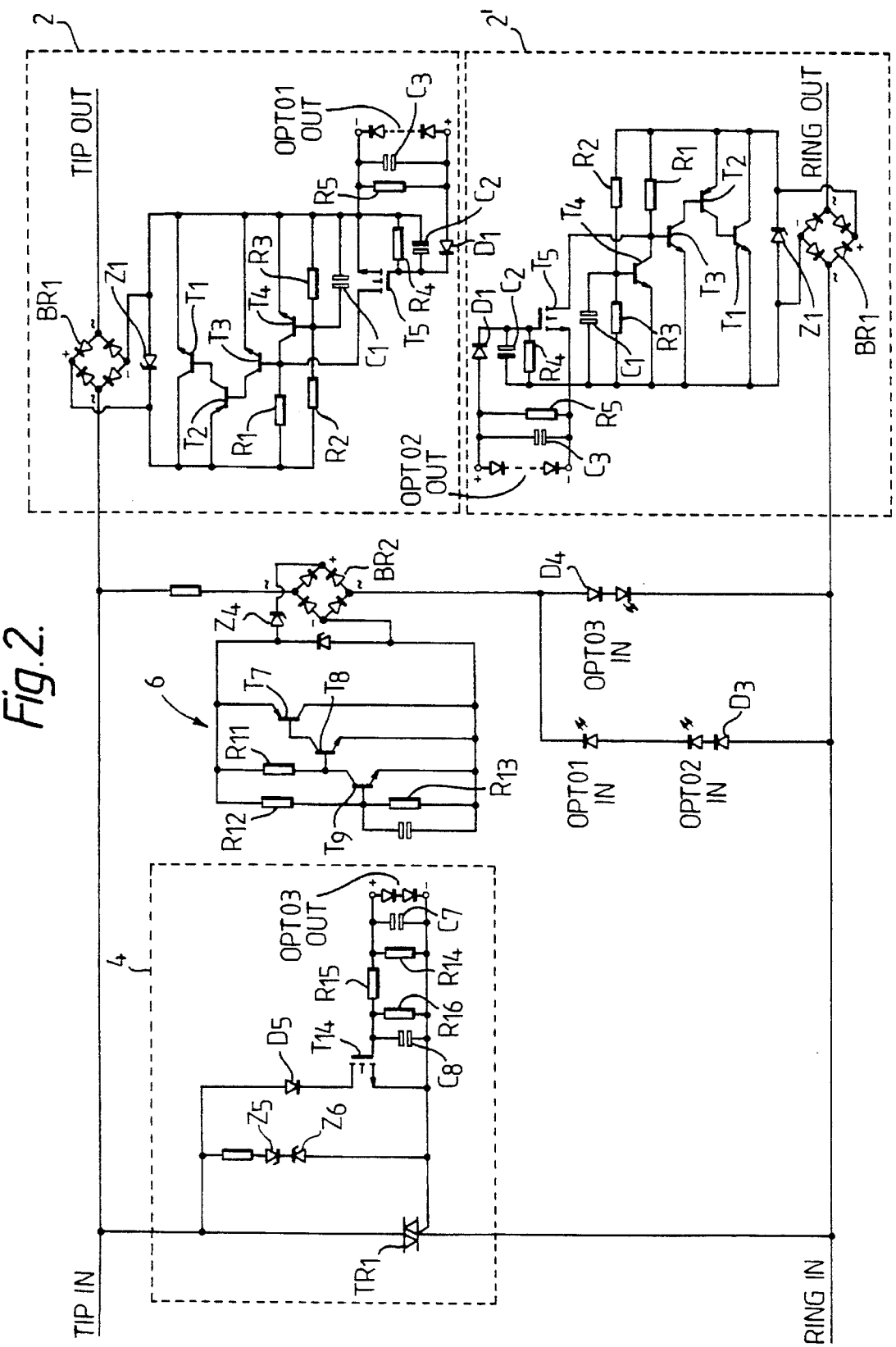
FIG. 2 is a circuit diagram of one form of an arrangement shown in FIG. 1.

The electrical circuit forming the MTU is shown in FIG. 2.

Each series switching circuit 2 and 2' comprises three transistors $T_1$, $T_2$ and $T_3$ in complementary darlington configuration that are series connected in the associated line within a diode bridge $BR_1$ and form a switching transistor. The base terminal of the darlington triplet is held in a potential divider formed by resistor $R_1$ and overcurrent control transistor $T_4$, the potential divider spanning the darlington triplet, and the base terminal of the control transistor $T_4$ is itself held in a potential divider formed by resistors $R_2$ and $R_3$ which also spans the darlington triplet switching transistor. This circuit will protect the system from an overcurrent in the tip or ring line as follows: As the voltage on the line increases from zero all the transistors will be off until the voltage across the circuit exceeds the voltage dropped across the diode bridge plus a single pn junction drop for the switching transistor. The switching transistor will then turn on to allow current to flow while control transistor $T_4$ remains off. If the current in the line increases, the base voltage of control transistor $T_4$ will increase due to the voltage drop across $R_3$ until transistor $T_4$ turns on when an overcurrent is experienced. This will cause the baseemitter terminals of the switching transistor to be shorted and the switching transistor to turn off, thereby blocking current flow in the line. In this state the leakage current will be determined by the value of $R_1$, $R_2$ and $R_3$ which will typically be in the range of 50Ω to 1MΩ. A 100 nF capacitor $C_1$, is connected in parallel with resistor $R_3$ in order to inhibit switching on of transistor $T_1$. This will prevent tripping of the switching circuit by transient surge currents due to inductance and capacitance on the line when the system is first switched on. In addition, a Zener diode $Z_1$ is connected across transistor $T_1$ in order to protect the switching circuit 2 from voltages exceeding the transistors' operating voltages, for example, large inductive spikes.

In addition to the overcurrent control transistor $T_4$, an enhancement mode test control FET $T_5$ is connected between the base and emitter terminals of the switching transistor. The gate terminal of FET $T_5$ is connected to the window circuit so that the switching circuit can be switched on and off remotely.

The shunt switching circuit 4 comprises a triac $TR_1$ that is connected between the tip and ring lines and whose gate terminal is connected to the tip line via a pair of back-to-back Zener diodes $Z_5$ and $Z_6$ and gate current limiting resistor $R_{17}$. When an overvoltage is experienced that exceeds the breakdown voltage of Zener diodes $Z_5$ and $Z_6$ a current pulse will be transmitted to the gate of the triac causing the tip and ring lines to be shorted. An enhancement mode FET $T_{14}$ is also connected between the gate of triac $TR_1$ and the tip line in order to allow remote switching of the shunt switching circuit 4. A diode $D_5$ is included to provide reverse breakdown protection for FET $T_{14}$.

The window circuit comprises a voltage level detector Zener diode $Z_4$ and a current level detection circuit 6 that are connected in series within a diode bridge $BR_2$ which is itself connected between the tip and ring lines. The Zener diode $Z_4$ will allow current to flow through the window circuit only when the voltage across it is 75 V, corresponding to a voltage between the lines of 80 V, while the current level detection circuit 6 will stop current flow through the window circuit at currents associated with a tip to ring voltage in excess of 100 V. The current level detection circuit 6 works on essentially the same principle as the series switching circuits 2 and 2'. A complementary darlington pair of transistors $T_7$ and $T_8$ form the switching transistor whose base terminal is held in a potential divider formed by 1MΩ resistor $R_{11}$ and control transistor $T_9$ whose base terminal is itself held in a voltage divider formed by a pair of 1MΩ resistors $R_{12}$ and $R_{13}$. When the voltage across transistor $T_7$ exceeds a pn junction drop, current will flow until the voltage across $R_{13}$ is sufficient to turn transistor $T_9$ on, whereupon the base emitter terminals of transistor $T_8$ are shorted and the darlington pair switches off.

Three opto-isolators OPTO1-3 are connected with their inputs in series with the voltage level detector Zener diode $Z_4$ and the current level detection circuit 6 and their outputs connected to the series and shunt switching circuits. Isolators OPTO1 and OPTO2 which are connected to the series switching circuits are in series with each other and in parallel with opto-isolator OPTO3 which is connected to the shunt switching circuit 4. The input of opto isolator OPTO3 is connected with opposite polarity to that of isolators OPTO1 and OPTO2 so that the series and the shunt switching circuits will be actuated with applied voltages of different polarity. Diodes $D_3$ and $D_4$ are included to prevent reverse breakdown of the LEDs in the opto-isolators caused by an application of a large reverse voltage.

When a DC signal of between 80 and 100 V with the correct polarity is applied to the lines, a current of about 10 mA will flow through the LED inputs of the opto isolators OPTO1 and OPTO2. The output of each opto isolator is passed through a low pass RC filter formed from resistor $R_5$ and capacitor $C_3$ which prevents spurious triggering of the switching circuits, and charges capacitor $C_2$ which is connected between the gate and source of test control FET $T_5$. Diode $D_1$ allows current to flow from OPTO1 into the capacitor but not the other way round, so that the discharge of capacitor $C_1$ is controlled by resistor $R_4$ also connected between the gate and source of FET T5.

Thus once capacitor $C_2$ has charged sufficiently to exceed the gate voltage of the test control FET $T_5$ the series switching circuit will open to disconnect the subscriber, and will remain open after removal of the actuating DC signal until capacitor $C_2$ has discharged through resistor $R_4$.

If the polarity of the applied DC signal is reversed a 10 mA current will flow through the LED of opto isolator OPTO3. The output voltage is passed through a low pass RC filter formed by resistors $R_{14}$, $R_{15}$, $R_{16}$, $C_7$ and $C_8$ and then to the gate of FET $T_{14}$, which will turn the FET on and trigger the triac, effectively shorting the two lines together and allowing loop-back testing of the system.

The arrangement may even be employed where the fault is a short circuit in the subscriber's equipment. In such a case any voltage applied at the exchange will be dropped along the line so that it will not be possible to apply the required actuating voltage to the window circuit. If, however, the applied voltage is reduced to below about 3.6 V, the voltage drop occurring across the switching transistor of each series switch will be insufficient to maintain the switch closed and the fault can thus be sectionalized.

Figure 3A:
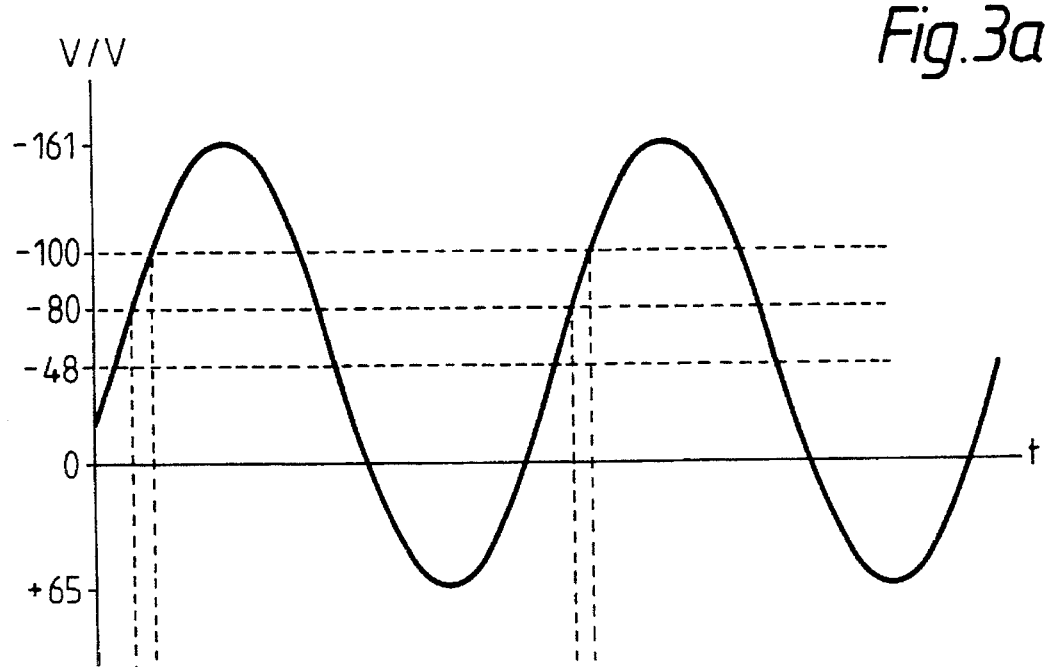
FIG. 3 is a graph showing the line voltage and the window circuit output voltage of the arrangement shown in FIG. 2 during a ringing signal.
Figure 3B:
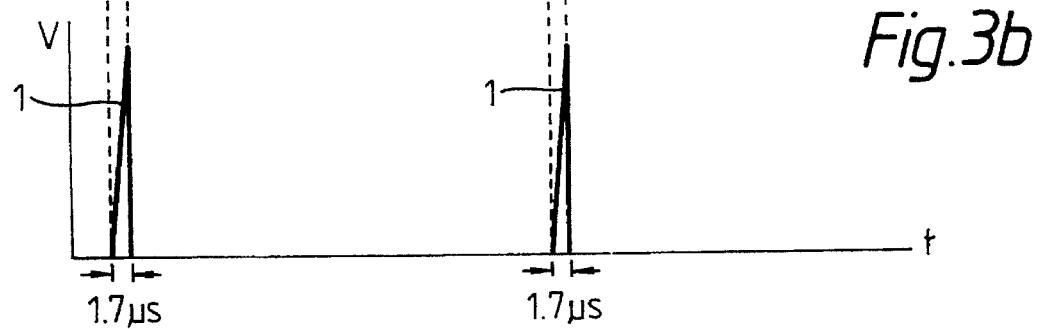
Figure 3C:
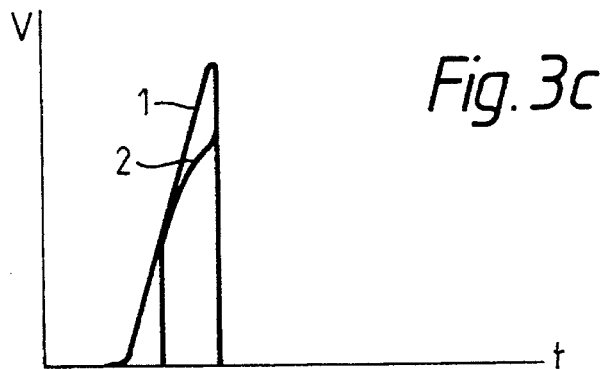

Spurious triggering of the shunt and series switching circuits due to the ringing signal on the lines is prevented as shown in FIG. 3. FIG. 3a shows the voltage appearing on the tip and ring lines when a ringing signal is transmitted. The signal comprise a sinusoidal ringing signal of 20 Hz frequency and 80 V RMS amplitude (226 V pp) superimposed on a battery voltage of −48 V. Although the instantaneous voltage on the line exceeds the testing voltage for a considerable period of time, the only time current is generated in the window circuit 3 is when the voltage on the lines is between 80 and 100 V on the rising edge of the ringing signal. FIG. 3b shows the input to the opto isolators (line 1). This consists of a train of pulses of about 1.7 ms width and occurring once per ringing cycle. The output from the (open ended) opto isolators is shown as line 2. This output starts to rise when the LED current has risen to about 5 mA. Pulses can easily be filtered out by means of the RC filters formed by $C_3$ and $R_5$ in the series switching circuits and by $C_7$, $C_8$, $R_{14}$, $R_{15}$ and $R_{16}$ in the shunt switching circuit. Usually the filters will have a cut-off point of at least 50 Hz, but normally not more than 500 Hz.

Figure 4:
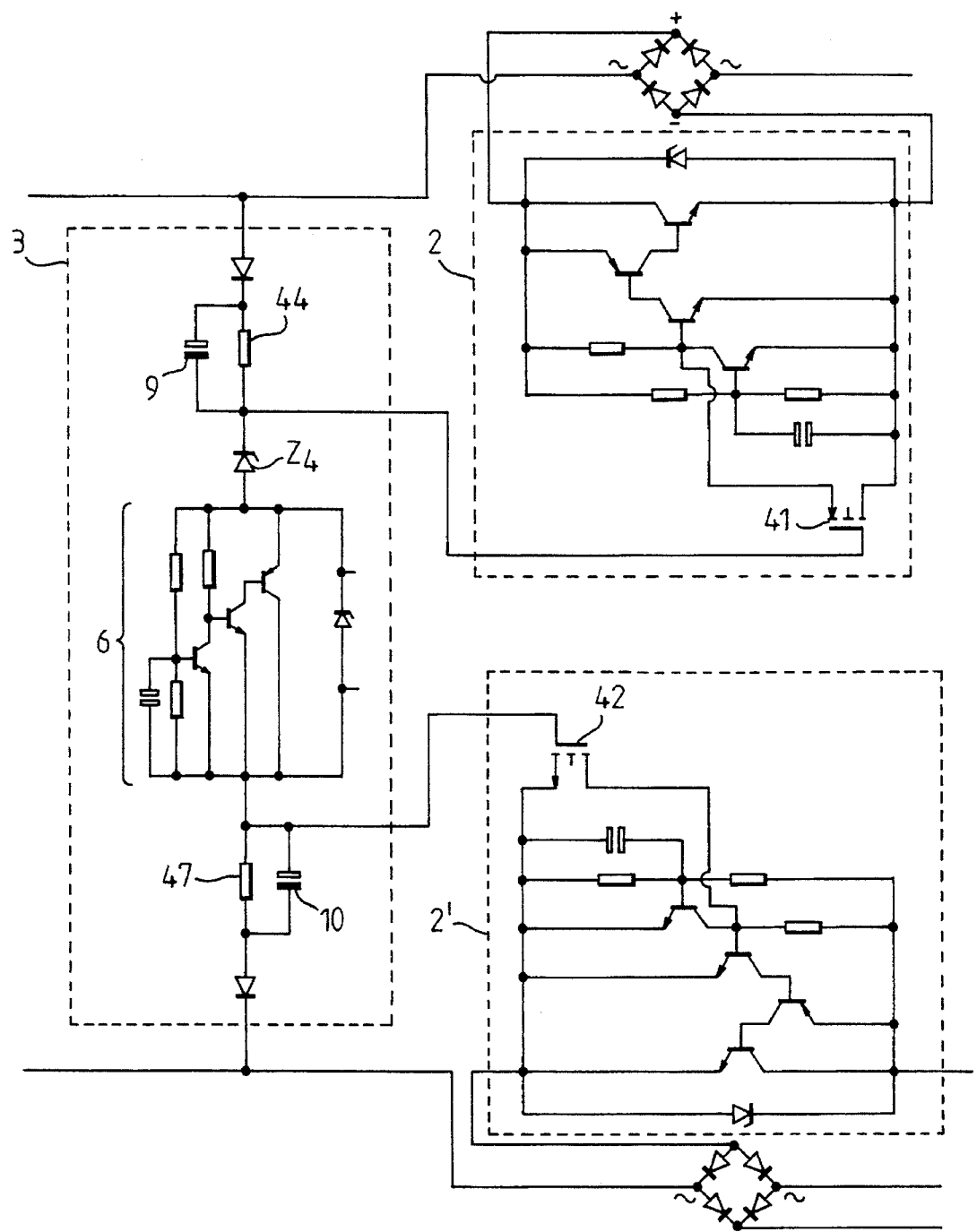
FIG. 4 is a circuit diagram of a second form of arrangement.

FIG. 4 shows an alternative form of arrangement in which the window circuit is directly coupled to the series switching circuits. The series switching circuits 2 and 2' are largely the same as those shown in FIG. 2, as is the combination of the current level detection circuit 6 and Zener diode $Z_4$ for determining the voltage window that will actuate the switches.

Series switching circuit 2 includes a p-channel enhancement mode FET 41, while switching circuit 2' includes an n-channel enhancement mode FET 42 as test control elements.

The window circuit includes a pair of resistors 44 and 47 from which the gate voltages of FETs 41 and 42 are derived. Capacitors 9 and 10 are connected in parallel with resistors 44 and 47 in order to filter out any short spurious signals and also so that they will charge up on receipt of the correct test voltage and hold FETs 41 and 42 open for a period of time after termination of the DC actuating signal. Steering diodes are provided to prevent reverse system voltages affecting the two FETs 41 and 42.

When a test voltage signal is received, current will flow through the window circuit 3 and a voltage drop will develop across resistors 44 and 47, making the gate of FET 41 more negative than its source, and the gate of FET 42 more positive than its source, thereby opening the switching circuits 2 and 2'.

A similar additional window circuit of opposite polarity may be provided in order to control a shunt switching circuit.

We claim:

1. A switching arrangement which can be connected in a communications channel, the communications channel comprising a pair of lines, the switching arrangement, in use, being connected between sets of terminal equipment, and comprising:

(i) first and second series switching circuits, each of which, in use, is series connected in one of the lines and will open when subjected to an overcurrent in the line in which it is series connected; and (ii) a shunt switching circuit which, in use, is connected between the lines, or between one of the lines and ground, and which will close when subjected to an overvoltage;

wherein the first series switching circuit, the second series switching circuit and the shunt switching circuit can be remotely actuated by means of a test signal sent along the channel.

2. A switching arrangement which can be connected in a communications channel, the communications channel comprising a pair of lines, the switching arrangement, in use, being connected between sets of terminal equipment, and comprising:

(i) first and second series switching circuits, each of which, in use, is series connected in one of the lines and will open when subjected to an overcurrent in the line in which it is series connected; and (ii) optionally, a shunt switching circuit which, in use, is connected between the lines, or between one of the lines and ground, and which will close when subjected to an overvoltage;

wherein (a) the first series switching circuit, the second series switching circuit, and, if present, the shunt switching circuit can be remotely actuated by means of a test signal sent along the channel; and (b) each series switching circuit comprises a switching transistor which is selected from bipolar transistors and field effect transistors, which, if it is a bipolar transistor comprises a collector, an emitter and a base, and, if it is a field effect transistor comprises a drain, a source and a gate, and whose base or gate voltage is controlled by an overcurrent control element, the overcurrent control element switching on when the switching circuit is subjected to an overcurrent, thereby switching the switching transistor off.

3. An arrangement as claimed in claim 2, wherein the overcurrent control element is a transistor which is selected from bipolar transistors and field effect transistors, which, if it is a bipolar transistor comprises a collector, an emitter and a base, and, if it is a field effect transistor comprises a drain, a source and a gate, the base or gate terminal of which is held in a voltage divider which spans the series switching circuit so that its base-emitter or gate-source voltage increases with the current in the line.

4. An arrangement as claimed in claim 2, wherein each series switching circuit includes a test control element which also controls the base or gate voltage of the switching transistor, the test control element turning on, and thereby turning the switching transistor off, in response to the test signal.

5. A switching arrangement which can be connected in a communications channel, the communications channel comprising a pair of lines, the switching arrangement, in use, being connected between sets of terminal equipment, and comprising:

(i) first and second series switching circuits, each of which, in use, is series connected in one of the lines and will open when subjected to an overcurrent in the line in which it is series connected;

(ii) optionally, a shunt switching circuit which, in use, is connected between the lines, or between one of the lines and ground, and which will close when subjected to an overvoltage; and (iii) a DC voltage window detector circuit which is connected between the lines and which will actuate the switching circuits when the voltage between the lines is within a predetermined band, but will not actuate the switching circuits when the voltage between the lines is not within the predetermined band wherein the first series switching circuit, the second series switching circuit, and, if present, the shunt switching circuit can be remotely actuated by means of a test signal sent along the channel.

6. An arrangement as claimed in claim 1, wherein the shunt switching circuit will connect the lines via a distinctive termination when actuated by the test signal.

7. An arrangement as claimed in claim 1, wherein the shunt switching circuit comprises a triac connected between the lines.

8. An arrangement as claimed in claim 5, wherein the window detector circuit is coupled to the series and shunt switching circuits via optoelectronic couplers.

9. An arrangement as claimed in claim 4, wherein each series switching circuit includes a capacitor connected to an input terminal of the test control element, the capacitor being charged during actuation of the switching circuits by an actuating DC signal and holding the switching circuit open for a period of time after termination of the actuating DC signal.

10. An array of switching arrangements which, in use, are connected in a communications channel in order to divide the channel into sections for locating a fault, the communications channel comprising a pair of lines, each arrangement:

(1) having a different DC voltage actuation window from each other arrangement, and (2) comprising
(i) first and second series switching circuits, each of which, in use, is series connected in one of the lines and will open when subjected to an overcurrent in the line in which it is series connected, and (ii) a shunt switching circuit, which, in use, is connected between the lines, or between one of the lines and ground, which will close when subjected to an overvoltage, wherein the first series switching circuit, the second series switching circuit and the shunt switching circuit can be remotely actuated by means of a test signal sent along the channel.

* * * * *

UNITED STATES PATENT AND TRADEMARK OFFICE
CERTIFICATE OF CORRECTION

PATENT NO. : 5,604,785
DATED : February 18, 1997
INVENTOR(S) : Michael Challis

It is certified that error appears in the above-identified patent and that said Letters Patent is hereby corrected as shown below:

Column 3, line 12, replace "present" by--present,--.

Column 4, line 64, replace "non linear" by--non-linear--.

Column 6, lines 13-14, replace "baseemitter," by--base-emitter--.

Column 6, line 14 replace "shored" by--shorted--.

Column 6, line 18, replace "50Ω" by--50kΩ--.

Column 6, line 57 replace "form" by--forms--.

Column 7, line 6, replace "opto isloater" by--opto-isolator--.

Column 7, line 15, replace "opto isloators" by--opto-isolators--.

UNITED STATES PATENT AND TRADEMARK OFFICE
CERTIFICATE OF CORRECTION

PATENT NO. : 5,604,785
DATED : February 18, 1997
INVENTOR(S) : Michael Challis

It is certified that error appears in the above-identified patent and that said Letters Patent is hereby corrected as shown below:

Column 7, line 16, replace "opto isolator" by--opto-isolator--.

Column 7, line 24, replace "FET T5" by--FET $T_5$--.

Column 7, line 31, replace "opto isolator" by--opto-isolator".

Column 7, line 51, replace "comprise" by--comprises--.

Column 7, line 52, replace "(226 Vpp)" by--(226 Vp-p)--.

Column 7, line 58, replace "opto isolators" by--opto-isolators--.

Column 7, line 61, replace "opto isolators" by--opto-isolators--.

Claim 5, line 19 (column 9, line 44) replace "band" by--band;--.

Signed and Sealed this

Seventh Day of April, 1998

*Attest:*

BRUCE LEHMAN

*Attesting Officer*       *Commissioner of Patents and Trademarks*